United States Patent
Pelz et al.

(10) Patent No.: US 9,785,835 B2
(45) Date of Patent: Oct. 10, 2017

(54) METHODS FOR ASSISTING WITH OBJECT RECOGNITION IN IMAGE SEQUENCES AND DEVICES THEREOF

(75) Inventors: Jeff B. Pelz, Pittsford, NY (US); Thomas B. Kinsman, Penfield, NY (US); Daniel F. Pontillo, East Syracuse, NY (US); Susan M. Munn, Billerica, MA (US); Nicholas R. Harrington, Mason, OH (US); Brendon Ben-Kan Hsieh, Cincinnati, OH (US)

(73) Assignee: ROCHESTER INSTITUTE OF TECHNOLOGY, Rochester, NY (US)

( * ) Notice: Subject to any disclaimer, the term of this patent is extended or adjusted under 35 U.S.C. 154(b) by 1 day.

(21) Appl. No.: 13/427,519

(22) Filed: Mar. 22, 2012

(65) Prior Publication Data

US 2012/0328150 A1    Dec. 27, 2012

Related U.S. Application Data

(60) Provisional application No. 61/465,639, filed on Mar. 22, 2011.

(51) Int. Cl.
*G06K 9/00*    (2006.01)
(52) U.S. Cl.
CPC ................ *G06K 9/00604* (2013.01)
(58) Field of Classification Search
None
See application file for complete search history.

(56) References Cited

U.S. PATENT DOCUMENTS

| | | |
|---|---|---|
| 5,802,361 A | 9/1998 | Wang et al. |
| 6,480,840 B2 | 11/2002 | Zhu et al. |
| 6,606,411 B1 | 8/2003 | Loui et al. |
| 6,859,802 B1 | 2/2005 | Rui |
| 6,901,411 B2 | 5/2005 | Li et al. |
| 7,120,880 B1 | 10/2006 | Dryer et al. |

(Continued)

OTHER PUBLICATIONS

Ishiguro, Yoshio, et al. "Aided eyes: eye activity sensing for daily life." Proceedings of the 1st Augmented Human International Conference. ACM, 2010.*

(Continued)

*Primary Examiner* — Sean Conner
(74) *Attorney, Agent, or Firm* — Bond, Schoeneck & King, PLLC; Joseph Noto (57) ABSTRACT

A method, non-transitory computer readable medium, and apparatus that assist with object recognition includes determining when at least one eye of an observer fixates on a location in one or more of a sequence of fixation tracking images. The determined fixation location in the one or more of the sequence of images is correlated to a corresponding one of one or more sequence of field of view images. At least the determined fixation location in each of the correlated sequence of field of view images is classified based on at least one of a classification input or a measurement and comparison of one or more features of the determined fixation location in each of the correlated sequence of field of view images against one or more stored measurement feature values. The determined classification of the fixation location in each of the correlated sequence of field of view images is output.

27 Claims, 5 Drawing Sheets

(56) References Cited

U.S. PATENT DOCUMENTS

| | | | |
|---|---|---|---|
| 7,133,555 | B2 | 11/2006 | Acharya et al. |
| 7,783,085 | B2* | 8/2010 | Perlmutter ........ G06F 17/30256 382/118 |
| 8,165,406 | B2* | 4/2012 | Tan ...................... G06K 9/6215 382/100 |
| 2004/0174496 | A1* | 9/2004 | Ji et al. .......................... 351/209 |
| 2004/0213553 | A1* | 10/2004 | Nagahashi ........ G06F 17/30259 386/241 |
| 2004/0238732 | A1* | 12/2004 | State ............................. 250/250 |
| 2006/0109238 | A1 | 5/2006 | Lau et al. |
| 2009/0245573 | A1* | 10/2009 | Saptharishi ........ G06K 9/00771 382/103 |
| 2010/0046842 | A1* | 2/2010 | Conwell ...................... 382/218 |
| 2010/0128118 | A1* | 5/2010 | Swindells et al. .............. 348/78 |
| 2010/0226564 | A1* | 9/2010 | Marchesotti et al. ........ 382/159 |
| 2012/0294478 | A1* | 11/2012 | Publicover et al. .......... 382/103 |
| 2014/0140610 | A1* | 5/2014 | Tu et al. ....................... 382/159 |

OTHER PUBLICATIONS

Toyama, Takumi, et al. "Gaze guided object recognition using a head-mounted eye tracker." Proceedings of the Symposium on Eye Tracking Research and Applications. ACM, 2012.*

Bonino, Dario, et al. "A blueprint for integrated eye-controlled environments." Universal Access in the Information Society 8.4 (2009): 311-321.*

De Beugher, Stijn, et al. "Automatic analysis of eye-tracking data using object detection algorithms." Proceedings of the 2012 ACM Conference on Ubiquitous Computing. ACM, 2012.*

Li, Jia, and James Z. Wang. "Real-time computerized annotation of pictures." IEEE transactions on pattern analysis and machine intelligence 30.6 (2008): 985-1002.*

Mackworth, N. H. et al. "The gaze selects informative details within pictures", Perception and Psychophysics, (1967), vol. 2,(11) pp. 547-552.

Just, M. A. et al., "Eye Fixations and Cognitive Processes", Cognitive Psychology, (1976), 8, pp. 441-480.

Minka, T. P. et al., "Interactive learning using a "society of models"", Technical report No. 349, IEEE Workshop on Content-based Access of Image and Video Libraries, (1997), pp. 82-89.

Swain, M. J. et al., "Indexing Via Color Histograms", Third International Conference on Computer Vision (1990), pp. 390-393.

Swain, M. J., et al., "Color Indexing", International Journal of Computer Vision, (1991), 7:1, pp. 11-32.

Rui, Young, "A Relevance Feedback Architecture for Content-based Multimedia Information Retrieval Systems", IEEE Workshop on Content-based Access of Image and Video Libraries, (1997), pp. 82-89.

Salvucci, D. et al., "Identifying Fixations and Saccades in Eye-Tracking Protocols", In Proceedings of the 2000 Symposium on Eye Tracking Research & Applications (Palm Beach Gardens, Florida, United States, Nov. 6-8, 2000). ETRA '00. ACM, New York, NY, (2000), pp. 71-78.

Rothkopf, C. A. et al., "Head movement estimation for wearable eye tracker", In Proceedings of the 2004 Symposium on Eye Tracking Research & Applications (San Antonio, Texas, Mar. 22-24, 2004). ETRA '04. ACM, New York, NY, (2004), pp. 123-130.

Thrun, S. et al., "Simultaneous Localization and Mapping", In Siciliano, B. and Khatib, O., Springer Handbook of Robotics, Springer, Berlin (2008), pp. 871-889.

Munn, S. M. et al., "FixTag: An Algorithm for Identifying and Tagging Fixations to Simplify the Analysis of Data Collected by Portable Eye Trackers", ACM Transactions on Applied Perception, Special Issue on APGV, In press (Aug. 2009), vol. 6, No. 3, Article 16, pp. 1-25.

Busswell, G.T., "Centers of Interest and Patterns of Perception in Looking At Pictures", How People Look at Pictures: A Study of the Psychology of Perception in Art, The University of Chicago Press, Chicago, Published (1935) Chapter 2, pp. 18-82.

Yarbus, A.L., "Eye Movements During Pereption of Complex Objects", Eye Movement and Vision, New York: Plenum Press, Published (1967), Chapter VII, pp. 171-197.

Pontillo D. F., "Attachment A SemantiCode: Using Content Similarity and Database-driven Matching to Code Wearable Eyetracker Gaze Data", 2010 Eye Tracking Research Association Symposium, Published (Mar. 22, 2010), pp. 1-4.

* cited by examiner

METHODS FOR ASSISTING WITH OBJECT RECOGNITION IN IMAGE SEQUENCES AND DEVICES THEREOF

This application claims the benefit of U.S. Provisional Patent Application Ser. No. 61/465,639 filed Mar. 22, 2011, which is hereby incorporated by reference in its entirety.

FIELD

This technology relates to methods for assisting with object recognition in image sequences and devices thereof.

BACKGROUND

Eye-tracking has a well-established history of revealing valuable information about visual perception and more broadly about cognitive processes. Within this field of research, the objective is often to examine how an observer visually engages with the content or layout of an environment. When the observer's head is stationary (or accurately tracked) and the stimuli are static (or their motion over time is recorded), commercial systems exist that are capable of automatically extracting gaze behavior in scene coordinates. Outside the laboratory, where observers are free to move through dynamic environments, the lack of constraints precludes the use of most existing automatic methods.

A variety of solutions have been proposed and implemented in order to overcome this issue. One approach ("FixTag") utilizes ray tracing to estimate fixation on three-dimensional (3D) volumes of interest. In this scheme, a calibrated scene camera is used to track features across frames, allowing for the extraction of 3D camera movement. With this, points in a two-dimensional (2D) image plane can be mapped onto the scene camera's intrinsic 3D coordinate system. This allows for accurate ray tracing from a known origin relative to the scene camera. While this method has been shown to be accurate, it has limitations. Critically, it requires an accurate and complete a priori map of the environment to relate object identities with fixated volumes of interest. In addition, all data collection must be completed with a carefully calibrated scene camera, and the algorithm is computationally intensive.

Another proposed method is based on Simultaneous Localization and Mapping (SLAM) algorithms originally developed for mobile robotics applications. Like FixTag, current implementations of SLAM-based analyses require that the environment be mapped before analysis begins, and are brittle to scene layout changes, precluding their use in novel and/or dynamic environments.

SUMMARY

A method for assisting with object recognition includes determining with an object recognition processing apparatus when at least one eye of an observer fixates on a location in one or more of a sequence of fixation tracking images. The determined fixation location in the one or more of the sequence of fixation tracking images is correlated by the object recognition processing apparatus to a corresponding one of one or more sequence of field of view images. At least the determined fixation location in each of the correlated sequence of field of view images is classified by the object recognition processing apparatus based on at least one of a classification input or a measurement and comparison of one or more features of the determined fixation location in each of the correlated sequence of field of view images against one or more stored measurement feature values. The determined classification of the fixation location in each of the correlated sequence of field of view images is output with the object recognition processing apparatus.

A non-transitory computer readable medium having stored thereon instructions for assisting with object recognition comprising machine executable code which when executed by at least one processor, causes the processor to perform steps including determining when at least one eye of an observer fixates on a location in one or more of a sequence of fixation tracking images. The determined fixation location in the one or more of the sequence of fixation tracking images is correlating to a corresponding one of one or more sequence of field of view images. At least the determined fixation location in each of the correlated sequence of field of view images is classified based on at least one of a classification input or a measurement and comparison of one or more features of the determined fixation location in each of the correlated sequence of field of view images against one or more stored measurement feature values. The determined classification of the fixation location in each of the correlated sequence of field of view images is output.

An object recognition processing apparatus includes a memory coupled to one or more processors which are configured to execute programmed instructions stored in the memory including determining when at least one eye of an observer fixates on a location in one or more of a sequence of fixation tracking images. The determined fixation location in the one or more of the sequence of fixation tracking images is correlating to a corresponding one of one or more sequence of field of view images. At least the determined fixation location in each of the correlated sequence of field of view images is classified based on at least one of a classification input or a measurement and comparison of one or more features of the determined fixation location in each of the correlated sequence of field of view images against one or more stored measurement feature values. The determined classification of the fixation location in each of the correlated sequence of field of view images is output.

This exemplary technology provides a number of advantages including providing more effective and efficient methods, non-transitory computer readable medium and programmed computer apparatuses that assist with object recognition in image sequences. With this exemplary technology, an operator is not required to classify every frame from an entire input video stream or other sequence of images. Instead, with this exemplary technology the amount of data presented to the operator for classification is significantly reduced. Additionally, this exemplary technology may present an operator with a "best guess" or preliminary classification(s) which further speeds the classification process. Further, with this exemplary technology any naturally occurring sequence of images can be processed without any prior knowledge or planning regarding the environment being captured. This exemplary technology also may be extended to classify domains, such as remotely sensed imagery, biomedical imagery, surveillance imagery, manufacturing control and process monitoring, and traffic and security applications by way of example only.

DETAILED DESCRIPTION

Figure 1:
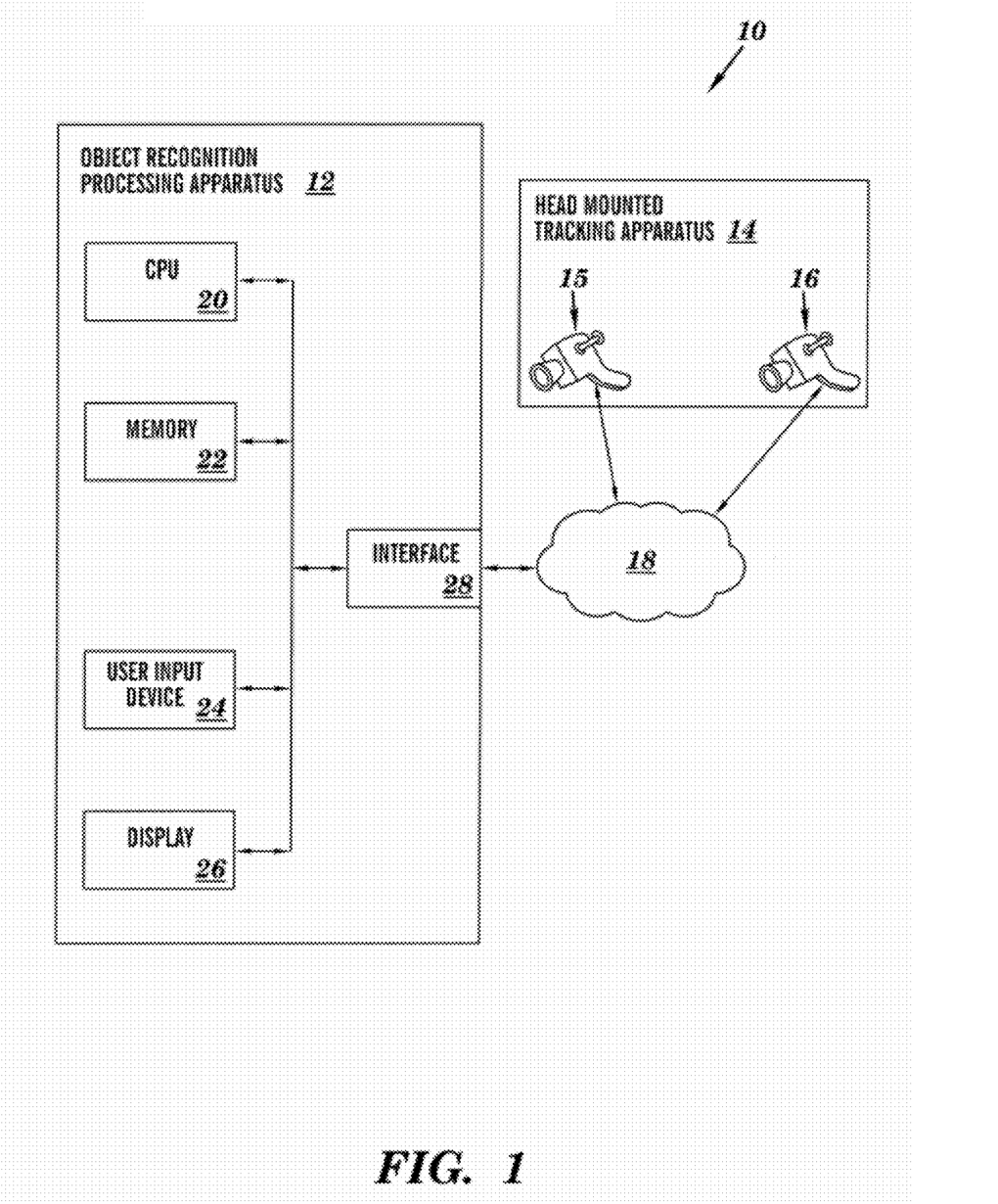
FIG. 1 is a block diagram of an environment with an exemplary object recognition processing apparatus.

An environment 10 with an exemplary object recognition processing apparatus 12 is illustrated in FIG. 1. The environment 10 includes object recognition processing apparatus 12, head mounted tracking apparatus 14 with a fixation-tracking video camera 15 and a view-tracking video camera 16 coupled together by at least one communication network 18, although the environment could include other types and numbers of systems, devices, components and other elements in other configurations. This technology provides a number a number of advantages including providing more effective and efficient methods, non-transitory computer readable medium and programmed computer apparatuses that assist with object recognition in image sequences.

The object recognition computing apparatus 12 includes at least one central processing unit (CPU) or processor 20, at least one memory 22, a user input device 24, a display 26, and an interface system 28 which are coupled together by a bus or other numbers and types of links, although the object recognition computing apparatus 12 may include other components and elements in other configurations. The central processing unit (CPU) or processor 20 executes a program of stored instructions for one or more aspects of the technology as described herein.

The memory 22 in the object recognition computing apparatus 12 stores these programmed instructions for execution by the processor 20 to perform one or more aspects of the technology as described herein, although some or all of the programmed instructions could be stored and/or executed elsewhere. A variety of different types of memory storage devices can be used for the memory 22 or other computer readable medium read from and/or written to by a magnetic, optical, or other reading and/or writing controllers/systems coupled to the processor 20, and combinations thereof.

The user input device 24 in the object recognition computing apparatus 12 is used to input selections and data. The user input device 24 can include a computer keyboard and a computer mouse, although other types and numbers of user input devices can be used. The display 26 in the object recognition computing apparatus 12 is used to show images and other information to the user. The display 26 can include a computer display screen, such as a CRT or LCD screen, although other types and numbers of displays could be used.

The interface system 28 is used to operatively couple and communicate between the object recognition computing apparatus 12 and other systems, devices and components over a communication network 18, although other types and numbers of communication networks or systems with other types and numbers of connections and configurations to other types and numbers of systems, devices, and components can be used. By way of example only, the communications can be wireless, although other types and numbers of communication systems, such as a direct connection, can be used.

The head mounted tracking apparatus 14 has the fixation-tracking video camera 15 and the view-tracking video camera 16, although the apparatus could have other types and numbers of video or other image capture devices in other configurations. In this example, the fixation-tracking video camera 15 is positioned to record one or both of an observer's eyes while the view-tracking video camera 16 is positioned to record what is in view of the observer. As illustrated and described in greater detail herein, the head mounted tracking apparatus 10 provides the video streams from the fixation-tracking video camera 15 and the view-tracking video camera 16 to the object recognition computing apparatus 12. The object recognition computing apparatus 12 correlates these two video streams to determine a region in the images from the view-tracking video camera 16 that one or both eyes of the observer were fixating on based on the correlated video stream from the eye-tracking camera 15. Although a head-mounted tracking apparatus is shown in this example, other types and numbers of tracking and/or image capture devices mounted in other manners to other devices and systems could be used.

Although an exemplary environment 10 with the object recognition computing apparatus 12 and the head mounted tracking apparatus 14 has the fixation-tracking video camera 15 and the view-tracking video camera 16 coupled together by at least one communication network 18 is described and illustrated herein, other types and numbers of systems, devices, components, and elements in other configurations can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more dedicated digital logic elements, such as ASIC, FPGA, and CPLD, general purpose computer systems, microprocessors, digital signal processors, and micro-controllers, configured and/or programmed according to the teachings of the examples, as described and illustrated herein, and as will be appreciated by those with ordinary skill in the art.

In addition, two or more computing systems or devices can be substituted for any one of the systems in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, such as near-field communications, cellular communications networks, G3 communications networks, Public Switched Telephone Network (PSTNs), Packet Data Networks (PDNs), the Internet, intranets, and combinations thereof.

The examples may also be embodied as non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for assisting with object recognition in a sequence of images will now be described with reference to FIGS. 1-5. More specifically, in FIG. 2 at step 100 the object recognition computing apparatus 12 obtains with the head mounted tracking apparatus 14 a sequence of fixation tracking images with the fixation-tracking video camera 15 and a sequence of field of view images with the view-tracking video camera 16 in an overlapping time frame, although other types and numbers of devices and systems can be used to obtain the images and other manners of obtaining the images can be used.

Figure 2:
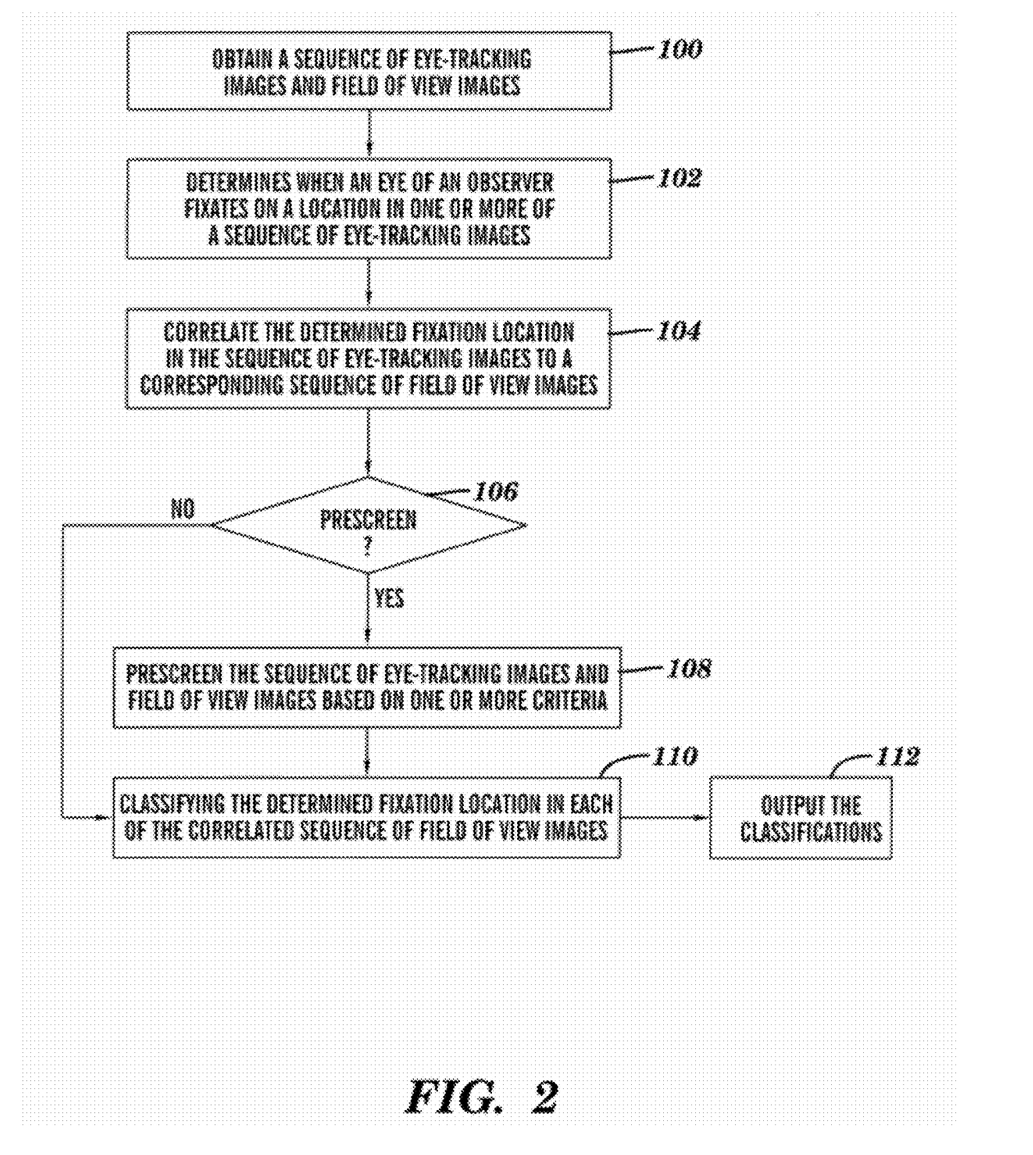
FIG. 2 is a flow chart of an exemplary method for assisting with object recognition in a sequence of images.
Figure 3A:
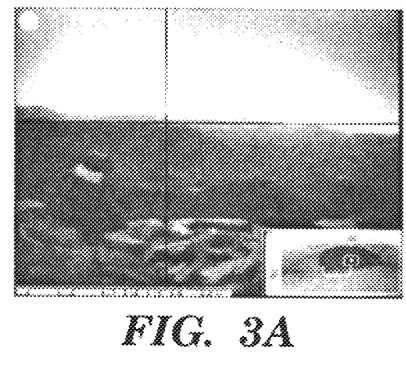
FIGS. 3A-3F are exemplary field of view images from a video recorded in an open, natural scene which contains irregular objects and other observers correlated with eye-tracking images to provide a determined fixation location.
Figure 3B:
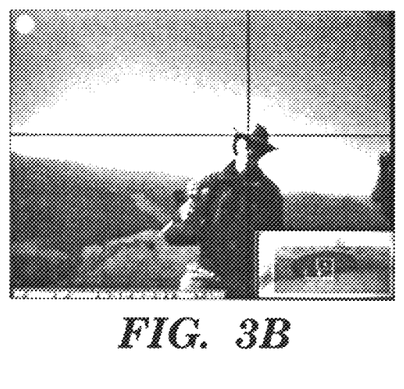
Figure 3C:
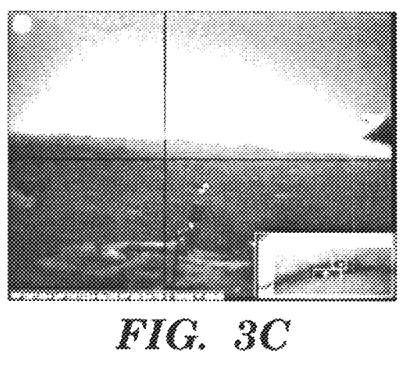
Figure 3D:
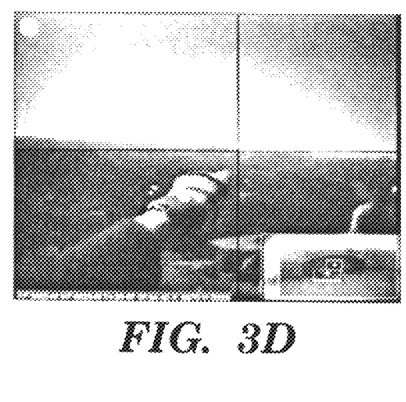
Figure 3E:
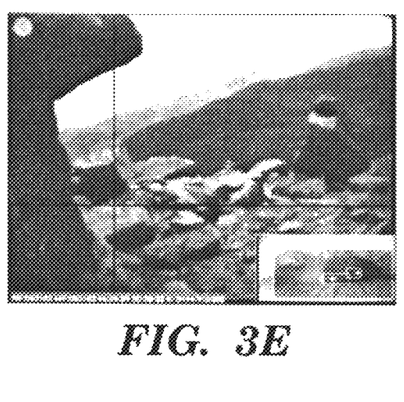
Figure 3F:
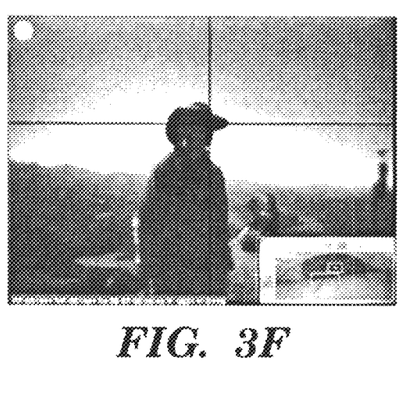

In step 102, the object recognition computing apparatus 12 determines when one or both eyes of an observer fixates on a location in one or more of a sequence of fixation tracking images, although other manners for determining fixations on other types and numbers of images can be used. In this example, the object recognition computing apparatus 12 determines fixation based on pupil and/or corneal reflection, although other methods for determining a location of an observer's gaze may be used. A variety of different methods for determining an observer's fixation location based on other image features could be used. By way of example only, the object recognition computing apparatus 12 could be programmed with machine learning techniques based on whole image data (rather than pupil and/or corneal reflection) to determine and provide a determined gaze or fixation position in the fixation tracking images.

In step 104, the object recognition computing apparatus 12 correlates the determined fixation location in the one or more of the sequence of fixation tracking images to a corresponding one of one or more sequence of field of view images. This correspondence can be based on spatial, spectral, and/or temporal correlation between the fixation location in the fixation tracking images and the stored field of view images. By way of example only, the correspondence can be found by spatial methods such as phase correlation or feature point matching, by spectral methods such as histogram intersection or spectrum matching, and/or combinations of spatial, spectral, and temporal methods. Since techniques for this type of correlation are well known to those of ordinary skill in the art, they will not be described here. By way of example only, FIGS. 3A-3F illustrate exemplary field of view images from a video recorded in an open, natural scene which contains irregular objects and other observers correlated with fixation tracking images to provide a determined fixation location at the center of the illustrated cross-hairs.

In step 106, the object recognition computing apparatus 12 determines whether to prescreen to eliminate one or more of the obtained sequence of field of view images, although other types and numbers of images could be prescreened. If in step 106, the object recognition computing apparatus 12 determines to prescreen, then the Yes branch is taken to step 108.

In step 108, the object recognition computing apparatus 12 prescreens to decide which of the sequence of field of view images require classification or other categorization and which can be eliminated based on one or more criteria, although other manners for prescreening to reduce the number of images or otherwise modify the images being processed can be used. By way of example only, one of the criteria which may be used is only retaining images in the sequence of field of view images to be classified that have corresponding identified fixations. By way of example only, at the start of a video, the only prescreening would be to screen out images in a sequence of field of view images that are part of a fixation. This screening significantly reduces operator workload because all images in a sequence of field of view images making up a single fixation will be of the same object. After training, the prescreening can further speed processing by screening out other frames of images in the field of view images, reducing the operator workload further. Examples of further prescreening which can be performed by the object recognition computing apparatus 12 include objects known to be of no interest to the operator (which can be ignored) and objects that have already been identified with a high degree of certainty (which can be identified without operator intervention).

Figure 4:
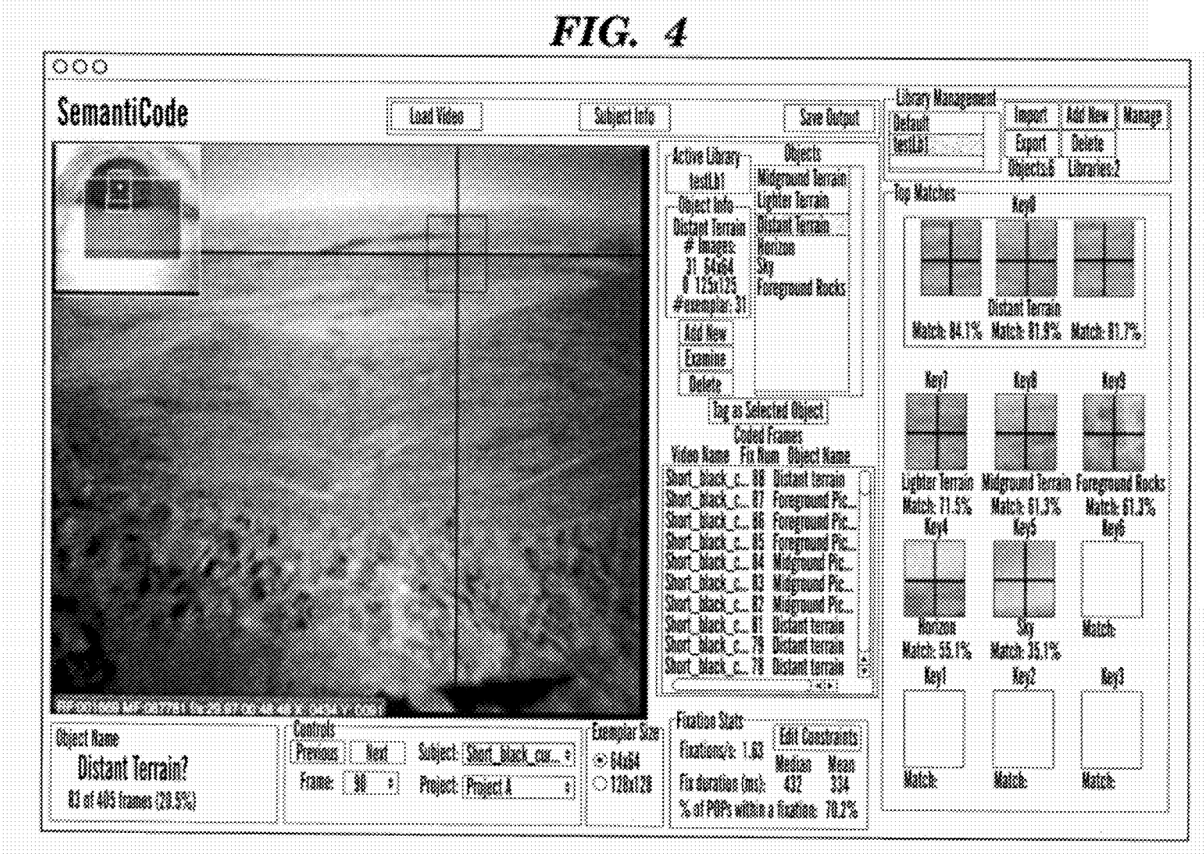
FIG. 4 is a screenshot of an exemplary graphical user interface (GUI) for interacting images from a video which have been tagged with determined fixation locations.
Figure 5:
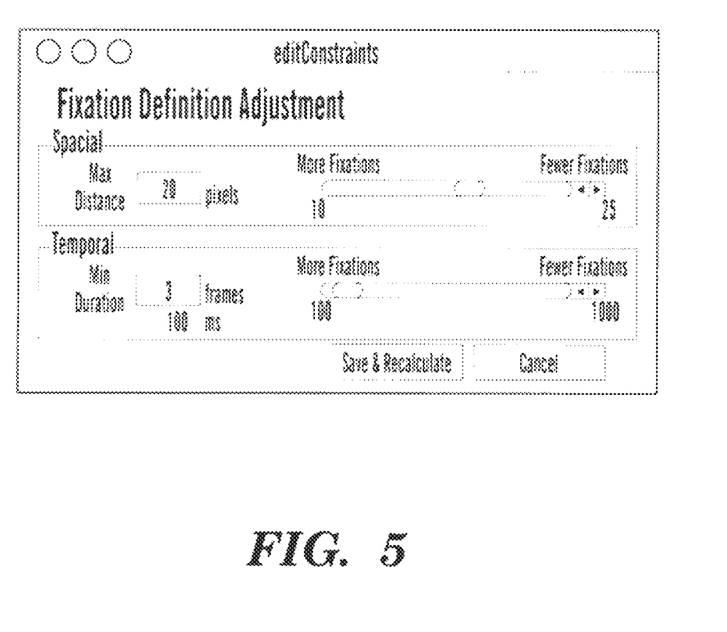
FIG. 5 is a screenshot of another exemplary fixation definition adjustment graphical user interface that enables an operator to shift constraints on what may be considered a fixation in order to produce more or fewer fixations.

If back in step 106, the object recognition computing apparatus 12 determines not to prescreen, then the No branch is taken to step 110. In step 110, the object recognition computing apparatus 12 classifies the determined fixation location in each of the correlated sequence of field of view images. In this example, initially as shown in FIG. 4 the object recognition computing apparatus 12 may provide an exemplary graphical user interface (GUI) for interacting images from a video which have been tagged with determined fixation locations on the display 26 which an operator can interact with using the user input device 24, although other manners for displaying and interacting with the correlated sequence of field of view images. Additionally, the object recognition computing apparatus 12 may provide as shown in FIG. 5 an exemplary fixation definition adjustment graphical user interface that enables an operator to shift constraints on what may be considered a fixation in order to produce more or fewer fixations, although other manners for adjusting constraints and identifying fixations can be used. Accordingly, initially an operator through these exemplary GUIs on the display 26 of the object recognition computing apparatus 12 can increase or decrease the determined fixations in the correlated sequence of field of view images and can build a classification database in memory 22 for future object recognition.

As the classification database in memory 22 of the object recognition computing apparatus 12 grows, the object recognition computing apparatus 12 may automate the classification process for determined fixations in the correlated sequence of field of view images. For example, the object recognition computing apparatus 12 may determine one or more preliminary classifications for each of the determined fixations in the correlated sequence of field of view images and then provide those on the display 26. An operator using user input device 24 at the object recognition computing apparatus 12 can select one of the preliminary classifications as the classification for the determined fixations in the correlated sequence of field of view images which is stored in the classification database in memory 22 for future object recognition.

In another example, the object recognition computing apparatus 12 may determine a preliminary classification for each of the determined fixations in the correlated sequence of field of view images and then provide those on the display 26 as well as an accuracy rating for the preliminary classification. The object recognition computing apparatus 12 may determine if the accuracy rating for each of the determined fixations in the correlated sequence of field of view images is above minimum accuracy threshold. If the object recognition computing apparatus 12 determines the accuracy rating for any of correlated sequence of field of view images is not above the minimum accuracy threshold, then the object recognition computing apparatus 12 may display those correlated sequence of field of view images for an operator to utilize, for example, the GUIs illustrated in FIGS. 4 and 5 to adjust fixation determinations and classify the fixations. If the object recognition computing apparatus 12 determines for any of the accuracy rating correlated sequence of field of view images is above the minimum accuracy threshold, then the object recognition computing apparatus 12 assigns the preliminary classification for those correlated sequence of field of view images as the classification. Additionally, the computing apparatus 12 may also require an additional constraint before automatically applying a classification label. By way of example only, a classification label may only be applied if in addition to the correlation exceeding a minimum accuracy threshold, there are no alternative matches in the database within a set band. By way of example, an operator may set parameters to allow automatic classification only if the best match exceeds a 95% correlation and the next best match does not exceed a 50% correlation.

By way of example, the object recognition computing apparatus 12 may determine the preliminary classifications discussed above by measuring one or more features of the determined fixation location in the correlated sequence of field of view images, although other types and numbers of elements in other regions could be measured. For example, the region around a determined fixation location may be analyzed or the entire image may be analyzed for object recognition. A wide range of spectral, spatial, and temporal features can be used in this recognition step by the object recognition computing apparatus 12. With this exemplary technology, the object recognition computing apparatus 12 can determine identity of an object independent of location, although location can be retained as a feature utilized by the object recognition computing apparatus 12 in identifying a fixation. In another example, a 'relative location' feature may be included by the object recognition computing apparatus 12 incorporating the semantic-based features of the region surrounding the fixated object. Further, the different features which are measured may be weighted by the object recognition computing apparatus 12 based on operator entered or previously stored weighting factors based on their previously determined relevance for object recognition.

Next, the object recognition computing apparatus 12 compares the one or more measured features against the one or more stored measurement feature values to determine one or more preliminary classifications for each of the determined fixation location in the correlated sequence of field of view images based on prior image analysis. Although a measurement and comparison method is used in this example, the object recognition computing apparatus could use other types and numbers of classification or other categorization methods, such as a ranking method or a clustering method with respect to identified features in the images. By way of example only, the object recognition computing apparatus 12 could pre-process all of the identified fixation frames and cluster them based on spatial, spectral, and/or temporal features before the operator begins classifying the images or during the classification. This clustering can significantly decrease operator workload by allowing multiple images to be classified at once, rather than one at a time. The clustering also speeds database training by adding a large number of example images to the training set more rapidly. By way of example, preprocessed frames could be clustered, them presented to the operator by the object recognition computing apparatus 12 grouped by similarity, instead of in serial order. In this way, if an observer made twenty-five fixations on a single object over a five-minute period, all twenty-five fixations could be identified at once instead of requiring multiple interactions.

In step 112, the object recognition computing apparatus 12 outputs the determined one or more preliminary classifications for each of the images, such as by showing them on the display 26 or storing them in memory 22 by way of example only.

Accordingly, as illustrated with the examples described herein, this technology offers a significant improvement over previous approaches to streamlining the coding of eye-tracking data. The immediate benefit is seen in the dramatically increased efficiency for video coding, and increased gains are anticipated with the semi-autonomous coding described. This technology also provides a valuable tool to support attaching semantic identifiers to image content. Additionally, this technology can be tuned to virtually any environment. By combining the power of database-driven identification with unique matching techniques, it will only be limited by the degree to which it is appropriately trained. It is thus useful both as a tool for evaluating which algorithms are useful in different experimental scenarios, and as an improved practical coding system with which to analyze eye-tracking or other fixation data in research, commercial, and other environments.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An adaptive method for aiding a user in classifying objects from field of view images using eye fixation, the method comprising:

obtaining a sequence of fixation tracking images from an eye tracking video of one or both of an observer's eyes and a sequence of field of view images from a view tracking video of what is in view of the observer, wherein the sequence of fixation tracking images are synchronized in time with the sequence of field of view images;

determining by an object recognition processing apparatus when in the sequence of fixation tracking images an eye of the observer fixates on a location in one or more images of the sequence of field of view images;

correlating by the object recognition processing apparatus the determined eye fixation to a location in the one or more images of the sequence of field of view images;

extracting image data surrounding the fixated location from the one or more images of the sequence of field of view images;

presenting an operator of the object recognition processing apparatus with the extracted image data;

specifying a label for an object within the presented image data to classify the object by i) the operator assigning a label to the object based upon the presented image data, ii) auto-accepting a label from labelled image data in a classification database for the object representing the closest match to the presented image data, or iii) showing the operator a ranked set of a plurality of labels from labelled image data in the classification database associated with the closest matches to the presented image data, wherein the operator selects one of the plurality of labels as the label for the object;

adding to the classification database a record of the presented image data comprising the specified label; and repeating the above determining, correlating, extracting, presenting, specifying and adding steps on a further unidentified object from the extracted image data, so as to build the classification database from the classified object and the further classified objects.

2. The method as set forth in claim 1 further comprising prescreening by the object recognition processing apparatus to eliminate one or more of the sequence of field of view images based on one or more criteria before the classifying.

3. The method as set forth in claim 1 wherein the classifying further comprises applying by the object recognition processing apparatus one or more weighting factors to a comparison of one or more measured features of the determined fixated object in at least one of the correlated sequence of field of view images against one or more stored measurement feature values.

4. The method as set forth in claim 1 wherein the classifying further comprises:
   determining by the object recognition processing apparatus one or more preliminary classifications of the determined fixated object in each of the correlated sequence of field of view images based on a measurement and comparison of the one or more features of the determined fixated object in at least one of the correlated sequence of field of view images against one or more stored measurement feature values;
   outputting by the object recognition processing apparatus the determined one or more preliminary classifications of the determined fixated object in the at least one of the correlated sequence of field of view images; and
   receiving at the object recognition processing apparatus a selection of one of the determined one or more preliminary classifications as the classification of the determined fixated object in the at least one of the correlated sequence of field of view images.

5. The method as set forth in claim 1 wherein the classifying with the object recognition processing apparatus further comprises:
   displaying by the object recognition processing apparatus the determined fixated object in at least one of the correlated sequence of field of view images; and
   receiving at the object recognition processing apparatus a classification input of the determined fixated object in the at least one of the correlated sequence of field of view images based on the displaying.

6. The method as set forth in claim 1 wherein the classifying further comprises:
   determining by the object recognition processing apparatus one or more preliminary classifications of the determined fixated object for at least one of the correlated sequence of field of view images based on a measurement and comparison of one or more of the features of the determined fixated object in the at least one of the correlated sequence of field of view images against one or more stored measurement feature values;
   determining by the object recognition processing apparatus an accuracy rating for each of the determined one or more preliminary classifications based on each of the comparisons of the measured one or more features of the determined fixated object in the at least one of the correlated sequence of field of view images against the one or more stored measurement feature values;
   determining by the object recognition processing apparatus when the determined accuracy rating with a highest value for one of the one or more preliminary classifications is above a first set threshold; and
   determining by the object recognition processing apparatus when the determined accuracy rating with a next highest value for another one of the one or more preliminary classifications is below a second set threshold; and
   setting by the object recognition processing apparatus the one of the one or more preliminary classifications with the determined accuracy rating with the highest value as the determined classification of the determined fixated object in the at least one of the correlated sequence of field of view images when the determined accuracy rating with the highest value is above the first set threshold and the determined accuracy rating with the next highest value is below the second set threshold.

7. The method as set forth in claim 1 wherein the determined fixated object in at least one of the correlated one or more sequence of field of view images comprises a region in each of the correlated one or more sequence of field of view images.

8. The method as set forth in claim 1 wherein the one or more features further comprise at least one of one or more spectral features, spatial features or temporal features.

9. The method as set forth in claim 8 wherein the one or more features further comprise one or more location features.

10. A non-transitory computer readable medium having stored thereon instructions for aiding a user in classifying objects from field of view images using eye fixation comprising machine executable code which when executed by at least one processor, causes the processor to perform steps comprising:
   obtaining a sequence of fixation tracking images from an eye tracking video of one or both of an observer's eyes and a sequence of field of view images from a view tracking video of what is in view of the observer, wherein the sequence of fixation tracking images are synchronized in time with the sequence of field of view images;
   determining when in the sequence of fixation tracking images at least one eye of an observer fixates on a location in one or more of a sequence of field of view images;
   correlating the fixated object within the determined eye fixation to a location in the one or more images of the sequence of field of view images to a corresponding one of one or more sequence of field of view images;
   extracting image data surrounding the fixated location from the one or more images of the sequence of field of view images;
   presenting an operator of the object recognition processing apparatus with the extracted image data;
   specifying a label for an object within the presented image data to classify the object by i) the operator assigning a label to the object based upon the presented image data, ii) auto-accepting a label from labelled image data in a classification database for the object representing the closest match to the presented image data, or iii) showing the operator a ranked set of a plurality of labels from labelled image data in the classification database associated with the closest matches to the presented image data, wherein the operator selects one of the plurality of labels as the label for the object;

adding to the classification database a record of the presented image data comprising the specified label; and repeating the above determining, correlating, extracting, presenting, specifying and adding steps on a further unidentified object from the extracted image data, so as to build the classification database from the classified object and the further classified objects.

11. The medium as set forth in claim 10 further comprising prescreening to eliminate one or more of the sequence of field of view images based on one or more criteria before the classifying.

12. The medium as set forth in claim 10 wherein the classifying further comprises applying one or more weighting factors to a comparison of one or more measured features of the determined fixated object in at least one of the correlated sequence of field of view images against one or more stored measurement feature values.

13. The medium as set forth in claim 10 wherein the classifying further comprises:

determining one or more preliminary classifications of the determined fixated object in each of the correlated sequence of field of view images based on a measurement and comparison of the one or more features of the determined fixated object in at least one of the correlated sequence of field of view images against one or more stored measurement feature values;

outputting the determined one or more preliminary classifications of the determined fixated object in the at least one of the correlated sequence of field of view images; and receiving a selection of one of the determined one or more preliminary classifications as the classification of the determined fixated object in the at least one of the correlated sequence of field of view images.

14. The medium as set forth in claim 10 wherein the classifying further comprises:

displaying the determined fixated object in at least one of the correlated sequence of field of view images; and receiving a classification input of the determined fixated object in the at least one of the correlated sequence of field of view images based on the displaying.

15. The medium as set forth in claim 10 wherein the classifying further comprises:

determining one or more preliminary classifications of the determined fixated object for at least one of the correlated sequence of field of view images based on a measurement and comparison of one or more of the features of the determined fixated object in the at least one of the correlated sequence of field of view images against one or more stored measurement feature values;

determining an accuracy rating for each of the determined one or more preliminary classifications based on each of the comparisons of the measured one or more features of the determined fixated object in the at least one of the correlated sequence of field of view images against the one or more stored measurement feature values;

determining when the determined accuracy rating with a highest value for one of the one or more preliminary classifications is above a first set threshold; and determining when the determined accuracy rating with a next highest value for another one of the one or more preliminary classifications is below a second set threshold; and setting the one of the one or more preliminary classifications with the determined accuracy rating with the highest value as the determined classification of the determined fixated object in the at least one of the correlated sequence of field of view images when the determined accuracy rating with the highest value is above the first set threshold and the determined accuracy rating with the next highest value is below the second set threshold.

16. The medium as set forth in claim 10 wherein the determined fixated object in at least one of the correlated one or more sequence of field of view images comprises a region in each of the correlated one or more sequence of field of view images.

17. The medium as set forth in claim 10 wherein the one or more features further comprise at least one of one or more spectral features, spatial features or temporal features.

18. The medium as set forth in claim 17 wherein the one or more features further comprise one or more location features.

19. An object recognition processing apparatus comprising:

one or more processors;

a memory coupled to the one or more processors which are configured to execute programmed instructions stored in the memory comprising:

obtaining a sequence of fixation tracking images from an eye tracking video of one or both of an observer's eyes and a sequence of field of view images from a view tracking video of what is in view of the observer, wherein the sequence of fixation tracking images are synchronized in time with the sequence of field of view images;

determining when in the sequence of fixation tracking images at least one eye of an observer fixates on a location in one or more images of a sequence of field of view images;

correlating the fixated object within the determined eye fixation to a location in the one or more images of the sequence of field of view images to a corresponding one of one or more sequence of field of view images;

extracting image data surrounding the fixated location from the one or more images of the sequence of field of view images;

presenting an operator of the object recognition processing apparatus with the extracted image data;

specifying a label for an object within the presented image data to classify the object by i) the operator assigning a label to the object based upon the presented image data, ii) auto-accepting a label from labelled image data in a classification database for the object representing the closest match to the presented image data, or iii) showing the operator a ranked set of a plurality of labels from labelled image data in the classification database associated with the closest matches to the presented image data, wherein the operator selects one of the plurality of labels as the label for the object;

adding to the classification database a record of the presented image data comprising the specified label; and repeating the above determining, correlating, extracting, presenting, specifying and adding steps on a further unidentified object from the extracted image data, so as to build the classification database from the classified object and the further classified objects.

20. The apparatus as set forth in claim 19 wherein the processor is further configured to execute programmed instructions stored in the memory further comprising pre-screening to eliminate one or more of the sequence of field of view images based on one or more criteria before the classifying.

21. The apparatus as set forth in claim 19 wherein the processor is further configured to execute programmed instructions stored in the memory for the classifying further comprising applying one or more weighting factors to a comparison of one or more measured features of the determined fixated object in at least one of the correlated sequence of field of view images against one or more stored measurement feature values.

22. The apparatus as set forth in claim 19 wherein the processor is further configured to execute programmed instructions stored in the memory for the classifying further comprising:
    determining one or more preliminary classifications of the determined fixated object in each of the correlated sequence of field of view images based on a measurement and comparison of the one or more features of the determined fixated object in at least one of the correlated sequence of field of view images against one or more stored measurement feature values;
    outputting the determined one or more preliminary classifications of the determined fixated object in the at least one of the correlated sequence of field of view images; and
    receiving a selection of one of the determined one or more preliminary classifications as the classification of the determined fixated object in the at least one of the correlated sequence of field of view images.

23. The apparatus as set forth in claim 19 wherein the processor is further configured to execute programmed instructions stored in the memory for the classifying further comprises:
    displaying the determined fixated object in at least one of the correlated sequence of field of view images; and
    receiving a classification input of the determined fixated object in the at least one of the correlated sequence of field of view images based on the displaying.

24. The apparatus as set forth in claim 19 wherein the processor is further configured to execute programmed instructions stored in the memory for the classifying further comprising:
    determining one or more preliminary classifications of the determined fixated object for at least one of the correlated sequence of field of view images based on a measurement and comparison of one or more of the features of the determined fixated object in the at least one of the correlated sequence of field of view images against one or more stored measurement feature values;
    determining an accuracy rating for each of the determined one or more preliminary classifications based on each of the comparisons of the measured one or more features of the determined fixated object in the at least one of the correlated sequence of field of view images against the one or more stored measurement feature values;
    determining when the determined accuracy rating with a highest value for one of the one or more preliminary classifications is above a first set threshold; and
    determining when the determined accuracy rating with a next highest value for another one of the one or more preliminary classifications is below a second set threshold; and
    setting the one of the one or more preliminary classifications with the determined accuracy rating with the highest value as the determined classification of the determined fixated object in the at least one of the correlated sequence of field of view images when the determined accuracy rating with the highest value is above the first set threshold and the determined accuracy rating with the next highest value is below the second set threshold.

25. The apparatus as set forth in claim 19 wherein the determined fixated object in at least one of the correlated one or more sequence of field of view images comprises a region in each of the correlated one or more sequence of field of view images.

26. The apparatus as set forth in claim 19 wherein the one or more features further comprise at least one of one or more spectral features, spatial features or temporal features.

27. The apparatus as set forth in claim 26 wherein the one or more features further comprise one or more location features.

* * * * *